(12) United States Patent
Guild et al.

(10) Patent No.: US 8,336,689 B2
(45) Date of Patent: Dec. 25, 2012

(54) BI-DIRECTIONAL IMPACT ABSORPTION DEVICE FOR A CLUTCH REACTION PLATE

(75) Inventors: Randall J. Guild, Okemos, MI (US); John P. Miller, Northville, MI (US); Andrew J Kasal, Westfield, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 687 days.

(21) Appl. No.: 12/496,181

(22) Filed: Jul. 1, 2009

(65) Prior Publication Data

US 2011/0000756 A1 Jan. 6, 2011

(51) Int. Cl.
*F16D 25/12* (2006.01)
(52) U.S. Cl. .................................................. 192/30 V
(58) Field of Classification Search .................. 192/54.1, 192/55.3, 55.6, 30 V
See application file for complete search history.

(56) References Cited

U.S. PATENT DOCUMENTS

| | | | |
|---|---|---|---|
| 1,671,436 A * | 5/1928 | Melott | 464/76 |
| 3,933,012 A * | 1/1976 | Ketchum | 464/20 |
| 4,303,149 A | 12/1981 | Lech, Jr. | |
| 4,613,029 A | 9/1986 | Beccaris | |
| 5,217,409 A * | 6/1993 | Dalbiez | 464/68.4 |
| 5,372,548 A * | 12/1994 | Wohlfeld | 464/20 |
| 5,924,928 A * | 7/1999 | Stegman et al. | 464/73 |
| 6,332,841 B1 * | 12/2001 | Secord | 464/20 |
| 6,808,455 B1 * | 10/2004 | Solorenko et al. | 464/20 |
| 7,017,724 B2 | 3/2006 | Hayabuchi et al. | |
| 2007/0045075 A1 | 3/2007 | Kani et al. | |

FOREIGN PATENT DOCUMENTS

DE 3149656 A1 7/1982

* cited by examiner

*Primary Examiner* — David D Le
*Assistant Examiner* — David J Hlavka

(57) ABSTRACT

A clutch reaction plate includes an annular device having a plurality of radially configured, alternating inwardly-oriented splines and keys, the splines and keys configured to meshingly engage a coaxial correspondingly-splined second device inserted therein. Selected ones of the splines include a bi-directional impact absorption device configured to engage selected ones of the splines of the inserted second device when a torque load is applied in one of a first rotational direction and a second, opposing rotational direction. The remaining splines engage the remaining splines of the inserted second device when the applied torque load exceeds a reaction force of the bi-directional impact absorption device.

14 Claims, 4 Drawing Sheets

BI-DIRECTIONAL IMPACT ABSORPTION DEVICE FOR A CLUTCH REACTION PLATE

TECHNICAL FIELD

This disclosure is related to clutch reaction plates for transferring torque.

BACKGROUND

The statements in this section merely provide background information related to the present disclosure and may not constitute prior art.

Power transmission devices can include clutch devices connected to rotating coaxial members to transfer torque, e.g., between an internal combustion engine, torque machines, planetary gears, and driveline components of a hybrid powertrain system. One element of a clutch device can include an outer clutch plate having a plurality of inwardly-oriented splines and keys that can engage corresponding keys and splines of an inner clutch plate of a torque-transmitting member. The inner and outer clutch plates engage by applying a thrust force, i.e., a compressive load between the inner and outer reaction plates. Each spline and key of the outer clutch plate and corresponding key and spline of the inner clutch plate has a predetermined amount of lash.

When there is a torque change that causes torque to be applied in the transmission, e.g., during a tip-in event or during a braking event that includes regenerative braking, there can be a change in rotational direction of the devices connected to one of the clutch plates. The splines of the inner clutch plate translate across the lash zone of the key and contact the splines of the outer clutch plate on the opposite side of the key. The impact of the splines on the outer clutch plate can generate an audible noise that is discernible to a vehicle operator, referred to as a driveline clunk.

Known methods for addressing and reducing audible driveline noise during torque transitions include machining splines and keyway surfaces to reduce impact energy, which adds manufacturing process steps.

SUMMARY

A clutch reaction plate includes an annular device having a plurality of radially configured, alternating inwardly-oriented splines and keys, the splines and keys configured to meshingly engage a coaxial correspondingly-splined second device inserted therein. Selected ones of the splines include a bi-directional impact absorption device configured to engage selected ones of the splines of the inserted second device when a torque load is applied in one of a first rotational direction and a second, opposing rotational direction. The remaining splines engage the remaining splines of the inserted second device when the applied torque load exceeds a reaction force of the bi-directional impact absorption device.

BRIEF DESCRIPTION OF THE DRAWINGS

One or more embodiments will now be described, by way of example, with reference to the accompanying drawings, in which.

DETAILED DESCRIPTION

Figure 1:
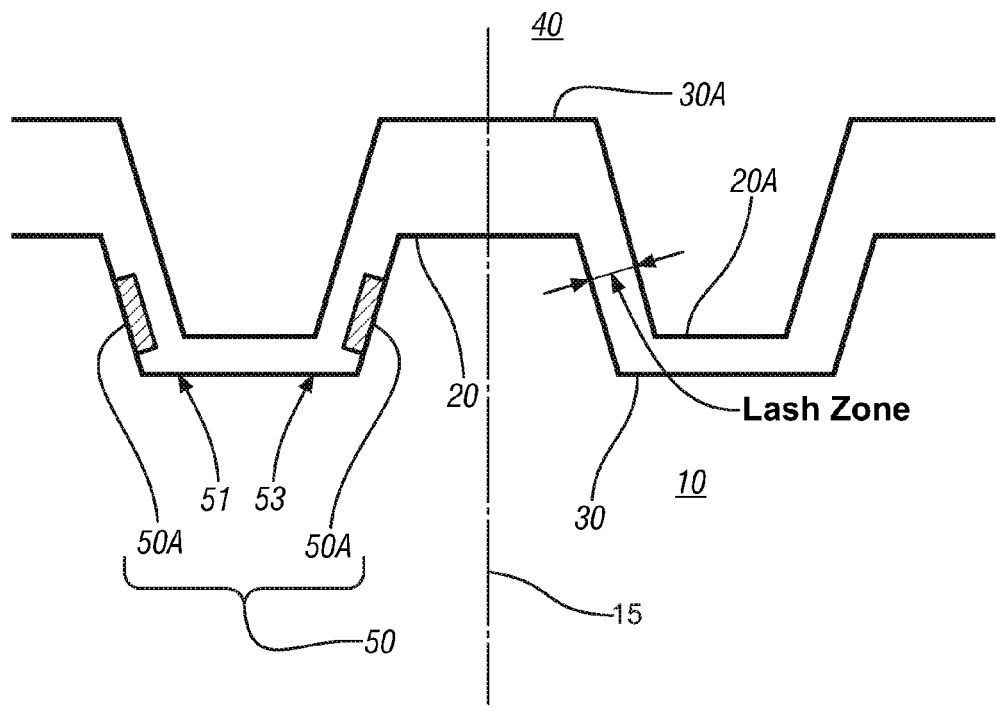
FIGS. 1, 2, 3A, 3B, 4A and 4B are two-dimensional schematic diagrams in accordance with embodiments of the present disclosure.

Referring now to the drawings, wherein the showings are for the purpose of illustrating certain exemplary embodiments only and not for the purpose of limiting the same, FIGS. 1, 2, 3A, 3B, 4A and 4B schematically illustrate embodiments of an outer clutch reaction plate 10 in accordance with the disclosure. Like reference numerals refer to like elements. The outer clutch reaction plate 10 includes a transmission housing in one embodiment, and is a cylindrically-shaped annular device preferably formed of cast metal, e.g., aluminum. The outer clutch reaction plate 10 can be used as a component of a hybrid transmission device (not shown) operative to transfer torque between an internal combustion engine, torque machines and a driveline to propel a vehicle, including generating tractive torque for forward propulsion and generating reactive torque for regenerative braking.

FIG. 1 schematically shows a portion of the outer clutch reaction plate 10 including a plurality of alternating inwardly-oriented splines 20 and keyways 30 formed about an inner circumference of the clutch reaction plate 10. Each of the splines 20 and keyways 30 projects radially towards the centerline axis and runs parallel to a centerline axis of the outer clutch reaction plate 10. A line 15 extending radially from the center point of the clutch reaction plate 10 is shown for reference. The splines 20 and keyways 30 are configured to meshingly engage a coaxial device inserted therein, e.g., a clutch plate 40. The clutch plate 40 has splines 20A and keyways 30A corresponding to the keyways 30 and splines 20 of the clutch reaction plate 10 such that splines 20A insert into the keyways 30 and splines 20 insert into the keyways 30A. The clutch plate(s) 40 is preferably coupled to a torque-transferring shaft (not shown) that is coaxial to the centerline axis of the clutch reaction plate 10. This configuration effects torque transfer between the clutch plate(s) 40 and the clutch reaction plate 10. Selected ones of the splines 20 include a bi-directional impact absorption device 50. The bi-directional impact absorption device 50 includes a compressible device that is operative to generate a reaction force in response to applied torque from the inserted second correspondingly splined device. The generated reaction force can absorb impact energy and can separate contiguous splines of the clutch plate(s) 40 and the clutch reaction plate 10. The bi-directional impact absorption device 50 includes a first element 50A that located on a first side 51 that is operative to absorb impact energy that is applied in a first rotational direction. The bi-directional impact absorption device 50 also includes the first element 50A that is located on a second side 53 that is operative to absorb impact energy that is applied in a second, opposing rotational direction. As shown, the first elements 50A located on the first and second sides 51 and 53 that are situated on opposing sides of contiguous splines 20. Alternatively, the first elements 50A may be situated on opposing sides of the same spline 20. A lash zone is depicted between spline 20 and spline 20A in the keyway 30, and includes a lateral distance between the spline 20 and the adjacent keyway 30.

Figure 2:
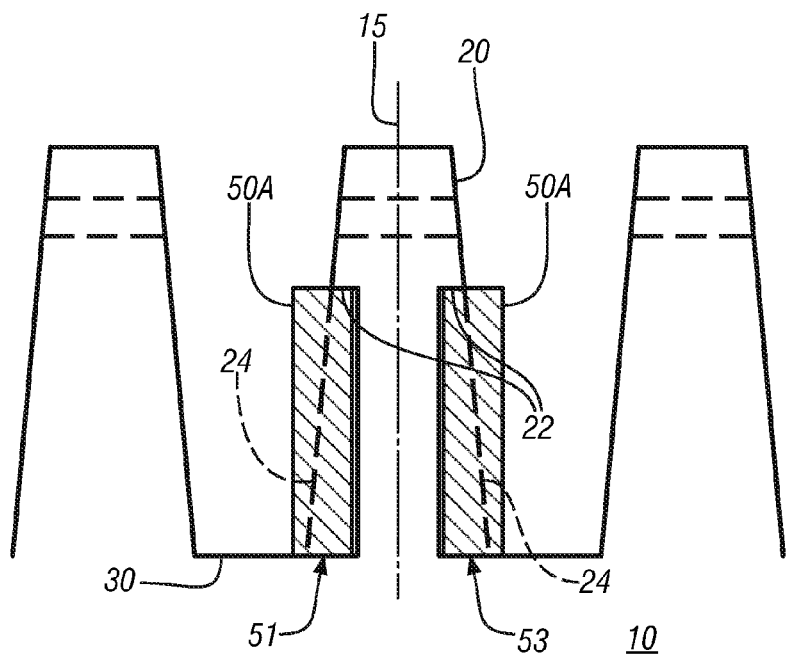

FIG. 2 shows an embodiment of the clutch reaction plate 10, with the bi-directional impact absorption device 50 comprising a pair of impact-absorbing bumper devices 50A. Each of the bumper devices 50A is fixedly inserted into a recess 22 of one of the splines 20 of the clutch reaction plate 10. In one embodiment, recesses 22 are machined into both sides of one of the splines 20, the recesses 22 each sized to accommodate one of the bumper devices 50A with a portion of the bumper device 50A extending beyond a profile line 24 of the spline 20, as shown. Alternatively, recesses 22 can be machined into opposing sides of adjacent splines 20, again the recesses 22 each sized to accommodate one of the bumper devices 50A. In one embodiment, the recesses 22 are machined such that the main surface of the recess 22 is parallel to the line 15 extending radially from the center point of the clutch reaction plate 10. Alternatively, the recesses 22 are machined such that the main surface of the recess 22 is parallel to the profile line 24. The profile line 24 of the spline 20 typically includes a casting draft angle of about 2°. In one embodiment, the bumper devices 50A each have a cross-sectional dimension that allows the bumper devices 50A to extend beyond the profile line 24 of the spline 20 to compress 22% to 33% when the clutch plate(s) 40 is fully loaded against the clutch reaction plate 10 with torque applied. Preferably, the compression occurs uniformly along the radial length of the bumper device 50A. In one embodiment, the bumper devices 50A are constructed from a compressible material, e.g., a fluoroelastomeric polymer material that has been extruded or molded into a specific shape. The material used for the bumper devices 50A is of a hardness to achieve the preferred reaction force when torque is applied. In one embodiment, the bumper devices 50A have a hardness of a 70 shore durometer. In one embodiment, the bumper device 50A has a rectangular cross-section that integrates with the recess 22.

Figure 3A:
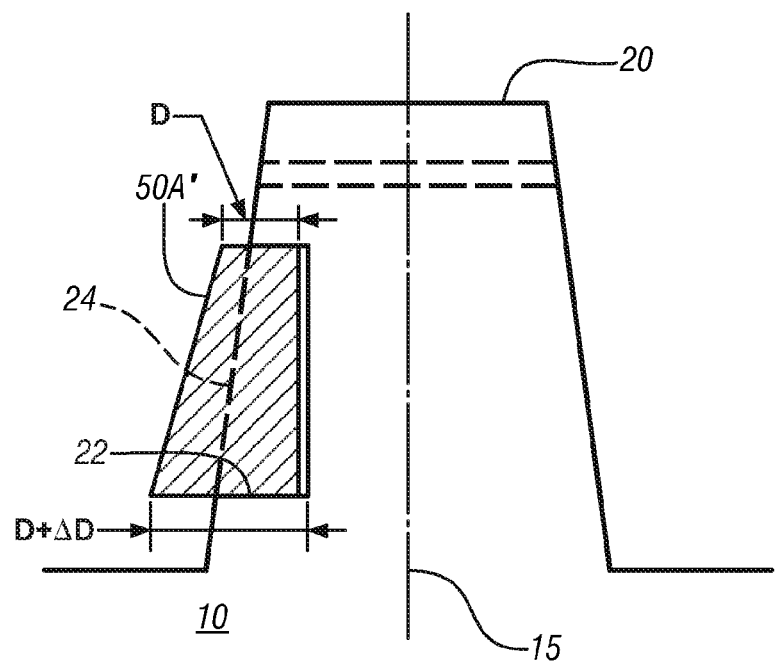
Figure 3B:
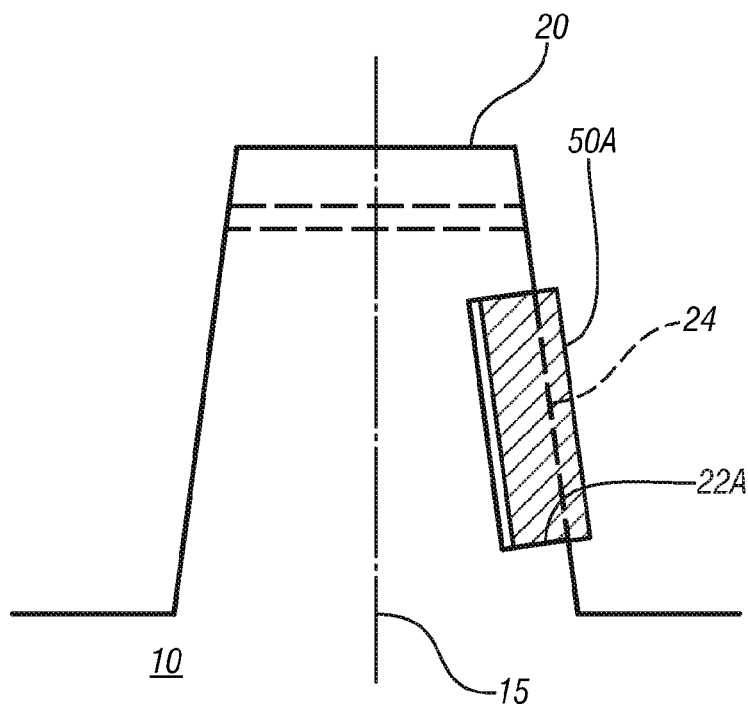

FIGS. 3A and 3B show alternate arrangements for the recess 22 and associated bumper device 50. The bumper device 50A and the bumper device 50A' each includes a portion that extends outwardly from the profile line 24 of the spline 20 when the bumper device 50A, 50A' is in a relaxed, uncompressed state. FIG. 3A shows bumper device 50A' having a right trapezoidal cross-section that is inserted into the recess 22, with the skewed surface of the trapezoid projecting beyond the profile line 24 of the spline 20. The bumper device 50A' has a first width (D) at a top portion and a second width (D+ΔD) at a bottom portion. In one embodiment (as shown), the skewed surface of the trapezoid projects non-uniformly beyond the profile line 24 from the top portion to the bottom portion. In one embodiment (not shown), the skewed surface of the trapezoid is parallel to the profile line 24 and projects uniformly beyond the profile line 24 from the top portion to the bottom portion.

FIG. 3B shows the bumper device 50A having the rectangular cross-section that associates with a recess 22A. The recess 22A is rectangularly-shaped and is machined into the spline 20 with an elongated surface that is parallel to the profile line 24 of the spline 20. The bumper device 50A is inserted therein, and a portion thereof uniformly projects beyond the profile line 24 of the spline 20.

The bumper device 50A, 50A' absorbs impact energy between the reactive clutch plate 10 and the clutch plate(s) 40 that occurs during a torque reversal. The bumper device 50A, 50A' is compressed when torque is applied across the inserted clutch plate(s) 40 and the reactive clutch plate 10. The bumper device 50A, 50A' exerts the reaction force between the clutch plate(s) 40 and the reactive clutch plate 10 when torque is applied. The reaction force encourages movement of clutch plate(s) 40 relative to the reactive clutch plate 10 when applied torque approaches zero torque, thus separating splines 20, 20A from corresponding keyways 30A, 30 of the clutch plate(s) 40 and the reactive clutch plate 10 and effecting a release of static friction formed therebetween, as is shown with reference to FIG. 6B.

Figure 4A:
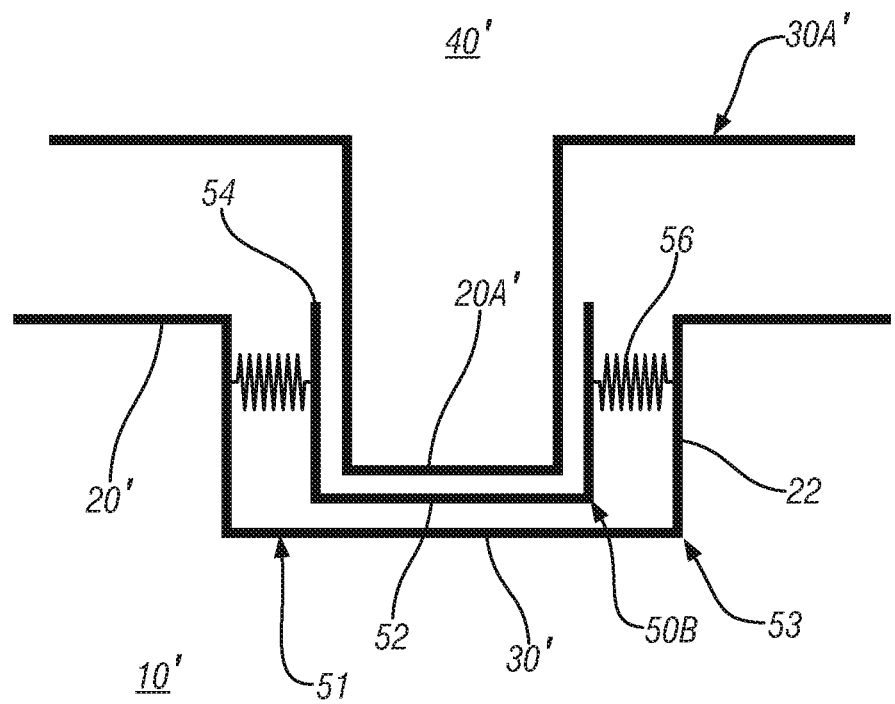

FIG. 4A schematically shows another embodiment of the bi-directional impact absorption device 50B. In this embodiment, the outer clutch reaction plate 10' includes a plurality of alternating inwardly-oriented splines 20' and keyways 30' formed about an inner circumference of the clutch reaction plate 10', configured to meshingly engage keyways 30A' and splines 20A' of clutch plate 40'. The bi-directional impact absorption device 50B includes a channel shaped device with a bottom portion 52 and side portions 54 including an outwardly extending spring 56 on each of the side portions 54. The bi-directional impact absorption device 50B is inserted and fixedly attached into the keyway 30' such that the springs 56 engage the sides 22 of the splines 20'. The bi-directional impact absorption device 50B is wide enough to accommodate inserting the spline 20A' of the clutch plate 40'. The bi-directional impact absorption device 50B is preferably formed from a single metal piece having the springs 56 integral to and formed from the single metal piece. The springs 56 are preferably constructed using material(s) and design that generate the preferred reaction force.

Figure 4B:
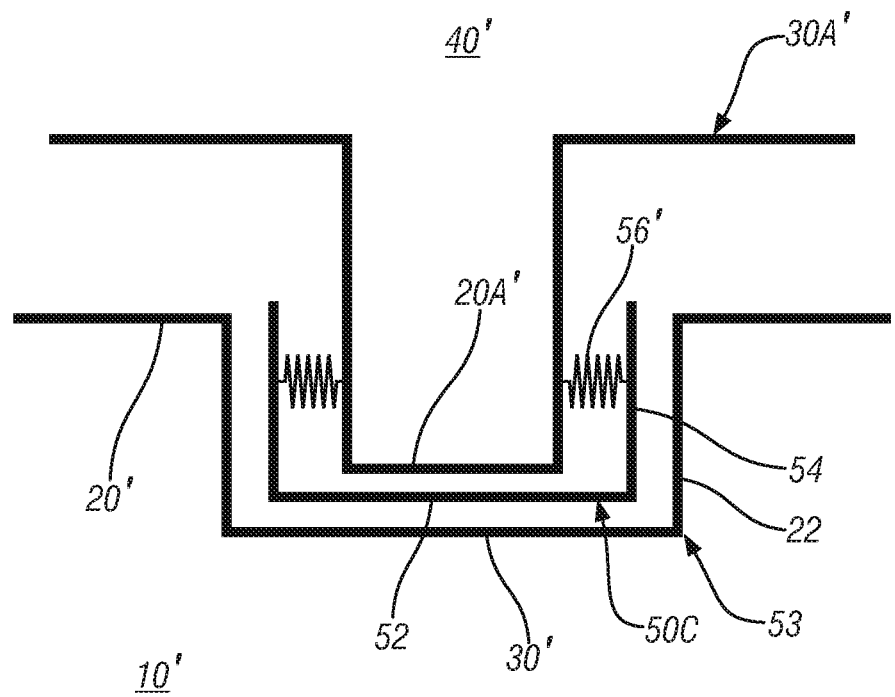
Figure 5:
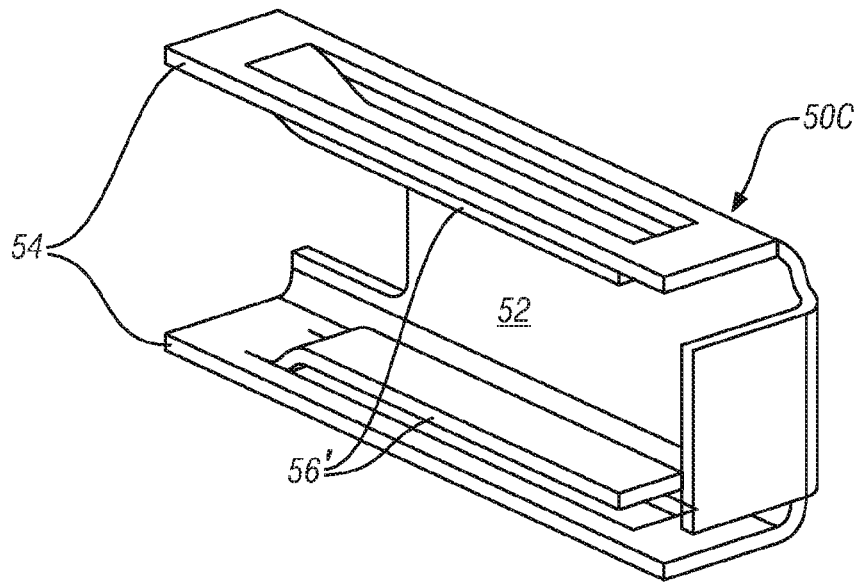
FIG. 5 is a three-dimensional schematic diagram, in accordance with an embodiment of the present disclosure.

FIG. 4B schematically shows another embodiment of the bi-directional impact absorption device 50C. In this embodiment, the bi-directional impact absorption device 50C includes a channel shaped device with a bottom portion 52 and side portions 54 and including an inwardly extending spring 56' on each of the side portions 54. The bi-directional impact absorption device 50C is fixedly attached to one of the splines 20A' of the clutch plate(s) 40' such that the springs 56' engage the sides of the spline 20A'. When the clutch plate(s) 40' are inserted into the reactive clutch plate 10', the splines of the clutch plate(s) 40' including spline 20A' with the bi-directional impact absorption device 50C are inserted into the keyways 30' of the reactive clutch plate 10'. The width of the bi-directional impact absorption device 50C is sufficiently small to be inserted into the keyway 30' of the reactive clutch plate 10'. The side portions 54 of the bi-directional impact absorption device 50C come into contact with sides 22 of the keyway 30'. The bi-directional impact absorption device 50C is preferably formed from a single metal piece with springs 56' that are preferably integral to and formed from the single metal piece. FIG. 5 schematically depicts a three-dimensional perspective drawing of an embodiment of the bi-directional impact absorption device 50C illustrating the concepts described above.

Each of the springs 56, 56' of the bi-directional impact absorption device 50B, 50C absorbs impact energy between the reactive clutch plate 10' and the clutch plate(s) 40' that occurs during a torque reversal. One of the springs 56, 56' is compressed when torque is applied across the inserted clutch plate(s) 40' and the reactive clutch plate 10'. One of the springs 56, 56' exerts the reaction force between the clutch plate(s) 40' and the reactive clutch plate 10' when torque is applied. The reaction force encourages movement of clutch plate(s) 40' relative to the reactive clutch plate 10' when applied torque approaches zero torque, thus separating splines 20A' from corresponding keyways 30' of the clutch plate(s) 40' and the reactive clutch plate 10' and effecting a release of static friction formed therebetween, as is shown with reference to FIG. 4A.

Figure 6A:
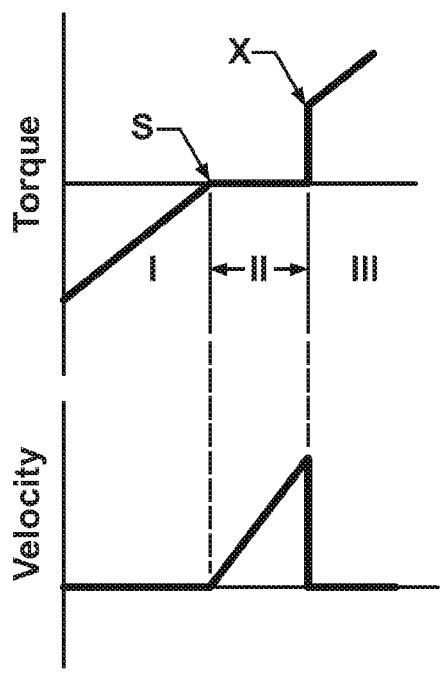
FIGS. 6A and 6B are graphical depictions, in accordance with an embodiment of the present disclosure.

FIG. 6A graphically shows, for a transmission lacking a bi-directional impact absorption device 50, torque applied across the clutch plate(s) and the reactive clutch plate and a corresponding velocity (V) of the clutch plate(s) relative to the reactive clutch plate over elapsed time, both occurring during a transition in the torque applied across the clutch plate(s) from a first direction to a second, opposite direction. A first portion (I) includes the torque monotonically increasing from a nominally negative value to zero torque, at which point no torque is applied. The velocity (V) of clutch plate(s)

relative to the reactive clutch plate is zero. Point S depicts the beginning of a second portion (II), including a lash state whereat the torque is zero and the velocity (V) of clutch plate(s) relative to the reactive clutch plate increases. Point X depicts the end of the lash state whereat the clutch plate(s) come into contact with the reactive clutch plate and begin to transfer torque thereacross. The velocity (V) of the clutch plate(s) relative to the reactive clutch plate immediately decreases to zero. Torque again increases during a third portion (III). The impact occurring at point X causes audible noise.

Figure 6B:
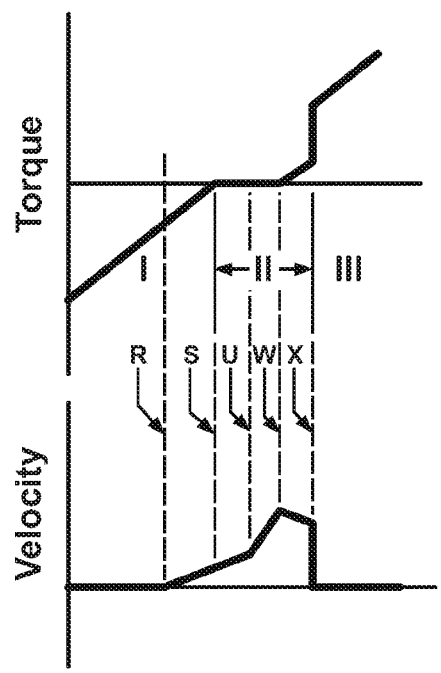

FIG. 6B graphically shows, for a transmission including the bi-directional impact absorption device 50, torque applied across the clutch plate(s) 40 and the reactive clutch plate 10 and a corresponding velocity (V) of the clutch plate(s) 40 relative to the reactive clutch plate 10 over elapsed time, both occurring during a transition in applied torque from a first direction to a second, opposite direction. The first portion (I) includes the torque increasing from a nominally negative value to zero torque, the second portion (II) includes the lash state, and the third portion (III) includes the torque increasing positively. The first portion (I) includes the torque applied across the clutch plate(s) 40 and the reactive clutch plate 10 with the compressive load applied on the first side 51 of the bi-directional impact absorption device 50. All the splines 20 and 20A of the clutch plate(s) 40 and the reactive clutch plate 10 are in contact, transferring torque in a nominally negative direction. Point R depicts a torque point at which the applied torque is sufficiently low to allow the reaction force of the first side 51 of the bi-directional impact absorption device 50 to move the corresponding splines of the clutch plate(s) 40, thus moving the clutch plate(s) 40 relative to the reactive clutch plate 10, as shown by an increase in velocity at a low rate. Most of the splines 20 and 20A of the clutch plate(s) 40 and the reactive clutch plate 10 begin separating. Point S depicts the beginning of the lash state, at which most of the splines and 20 and 20A of the clutch plate(s) 40 and the reactive clutch plate 10 are no longer in contact and are no longer transferring torque. Point U depicts a point at which the compressive load between the first side 51 of the bi-directional impact absorption device 50 and the corresponding splines of the clutch plate(s) 40 is zero. Subsequently, the velocity increases at an increased rate. Point W depicts a point at which corresponding splines 20 of the clutch plate(s) 40 come into contact with and begin applying compressive load to the second, opposing side 53 of the bi-directional impact absorption device 50, transferring torque between the clutch plate(s) 40 and the reactive clutch plate 10 in a nominally positive direction. The torque transfer increases, and correspondingly the velocity decreases during this period. Point X shows the end of the lash period, at which point all the splines 20 and 20A of the clutch plate(s) 40 and the reactive clutch plate 10 come into contact to transfer torque in the nominally positive direction, albeit at a reduced velocity. Hence, magnitude of the impact and corresponding audible noise reduces.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A clutch reaction plate, comprising:
    an annular device having a plurality of radially configured, alternating inwardly-oriented splines and keys, the splines and keys configured to meshingly engage a coaxial correspondingly-splined second device inserted therein;
    selected ones of the splines of the clutch reaction plate include a bi-directional impact absorption device configured to engage corresponding adjacent splines of the inserted second device when a torque is applied in one of a first rotational direction and a second, opposing rotational direction, wherein the bi-directional impact absorption device includes a first element on a first side of each selected spline configured to generate a reaction force responsive to said torque applied in the first rotational direction and a second element on a second side of each selected spline configured to generate a reaction force responsive to said torque applied in the second, opposing rotational direction, wherein each of the first and second elements comprises an impact-absorbing bumper device fixedly inserted into a respective recess on the respective first and second sides of the selected spline; and
    the non-selected splines of the clutch reaction plate configured to meshingly engage corresponding adjacent splines of the inserted second device only when the applied torque exceeds a reaction force of the bi-directional impact absorption device.

2. The clutch reaction plate of claim 1, wherein the first element on the first side and the second element on the second side comprise opposing sides of contiguous splines.

3. The clutch reaction plate of claim 1, wherein the first element on the first side and the second element on the second side comprise opposite sides of a common spline.

4. The clutch reaction plate of claim 1, wherein a portion of the bumper device extends beyond a profile line of the spline.

5. The clutch reaction plate of claim 1, wherein the bumper device comprises a compressible material having a rectangular cross-section that integrates with the recess of the spline.

6. The clutch reaction plate of claim 1, wherein the bumper device comprises a compressible material having a trapezoidal cross-section that integrates with the recess of the spline.

7. A clutch reaction plate, comprising:
    an annular device having a plurality of radially configured, alternating inwardly-oriented splines and keys, the splines and keys configured to meshingly engage a coaxial correspondingly-splined second device inserted therein;
    selected ones of the splines of the clutch reaction plate include a bi-directional impact absorption device configured to engage corresponding adjacent splines of the second device when a torque is applied in one of a first rotational direction and a second, opposing rotational direction, wherein the bi-directional impact absorption device includes a first element on a first side of each selected spline configured to generate a reaction force responsive to said torque applied in the first rotational direction and a second element on a second side of each selected spline configured to generate a reaction force responsive to said torque applied in the second, opposing rotational direction, wherein each of the first and second elements comprises an impact-absorbing device;
    the non-selected splines of the clutch reaction plate configured to meshingly engage corresponding adjacent splines of the second device only when the applied torque exceeds a reaction force of the bi-directional impact absorption device; and
    the bi-directional impact absorption device comprising a channel shaped device formed from a single metal piece having springs formed integral with the single metal piece and fixedly engaged to the selected ones of the splines.

8. The clutch reaction plate of claim 7, wherein the channel shaped device includes the single metal piece including a bottom portion and side portions including inwardly extending springs configured to react against first and second sides of a single one of the selected splines.

9. The clutch reaction plate of claim 7, wherein the channel shaped device is fixedly engaged in a keyway between two of the selected splines.

10. The clutch reaction plate of claim 9, wherein the channel shaped device includes a bottom portion and side portions including outwardly extending springs configured to react against sides of the two selected splines.

11. The clutch reaction plate of claim 1, wherein the bi-directional impact absorption device separates the remaining splines and the remaining splines of the inserted second device when the applied torque load is less than the reaction force of the bi-directional impact absorption device.

12. A torque transfer mechanism for a rotatable torque transfer device, comprising:

a spline projecting radially from a center axis, the spline configured to meshingly engage corresponding splines and keyways of a second, coaxial torque transferring device;

the spline including a bi-directional impact absorption device configured to engage selected ones of the splines of the second coaxial torque transferring device when a torque load is applied in one of a first rotational direction and a second rotational direction to transfer torque; and the bi-directional impact absorption device including a first element on a first side configured to generate a reaction force responsive to torque applied in the first rotational direction and a second element on a second side configured to generate the reaction force to torque applied in the second, opposing rotational direction, wherein each of the first and second elements comprises an impact-absorbing bumper device fixedly inserted into a recess on said side of the selected spline.

13. The torque transfer mechanism of claim 12, wherein a portion of the bumper device extends beyond a profile line of the spline.

14. The torque transfer mechanism of claim 12, wherein the bumper devices comprise a compressible material having a cross-section that integrates with the respective recess of the spline.

* * * * *